US010147237B2

(12) United States Patent
Sharma et al.

(10) Patent No.: US 10,147,237 B2
(45) Date of Patent: Dec. 4, 2018

(54) FOREGROUND IDENTIFICATION FOR VIRTUAL OBJECTS IN AN AUGMENTED REALITY ENVIRONMENT

(71) Applicant: Verizon Patent and Licensing Inc., Arlington, VA (US)

(72) Inventors: Manish Sharma, San Jose, CA (US); Anand Prakash, San Jose, CA (US); Devin Blong, Penngrove, CA (US); Qing Zhang, Cupertino, CA (US); Chetan Mugur Nagaraj, Fremont, CA (US); Srivatsan Rangarajan, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 104 days.

(21) Appl. No.: 15/271,418

(22) Filed: Sep. 21, 2016

(65) Prior Publication Data

US 2018/0082117 A1 Mar. 22, 2018

(51) Int. Cl.
*G06F 3/0484* (2013.01)
*G06T 7/73* (2017.01)
*G06T 19/00* (2011.01)
*G06T 19/20* (2011.01)

(52) U.S. Cl.
CPC ........ *G06T 19/006* (2013.01); *G06F 3/04842* (2013.01); *G06T 7/73* (2017.01); *G06T 19/003* (2013.01); *G06T 19/20* (2013.01); *G06T 2200/04* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 2013/0307875 A1* | 11/2013 | Anderson | G06T 19/006 345/633 |
| 2014/0253743 A1* | 9/2014 | Loxam | H04N 5/232 348/207.1 |
| 2016/0314622 A1* | 10/2016 | Davis | G06T 19/006 |
| 2017/0054897 A1* | 2/2017 | Shanmugam | H04N 5/23212 |
| 2017/0287443 A1* | 10/2017 | Boyce | G09G 5/377 |

* cited by examiner

*Primary Examiner* — Justin P. Misleh

(57) ABSTRACT

Systems described herein apply visual computer-generated elements into real-world images with an appearance of depth by using information available via conventional mobile devices. The systems receive a reference image and reference image data collected contemporaneously with the reference image. The reference image data includes a geo-location, a direction heading, and a tilt. The systems identify one or more features within the reference image and receive a user's selection of a foreground feature from the one or more features. The systems receive a virtual object definition that includes an object type, a size, and an overlay position of the virtual object relative to the foreground feature. The virtual object is provided in the virtual layer appearing behind the foreground feature. The systems store, in a memory, the reference image data associated with the virtual object definition.

20 Claims, 13 Drawing Sheets

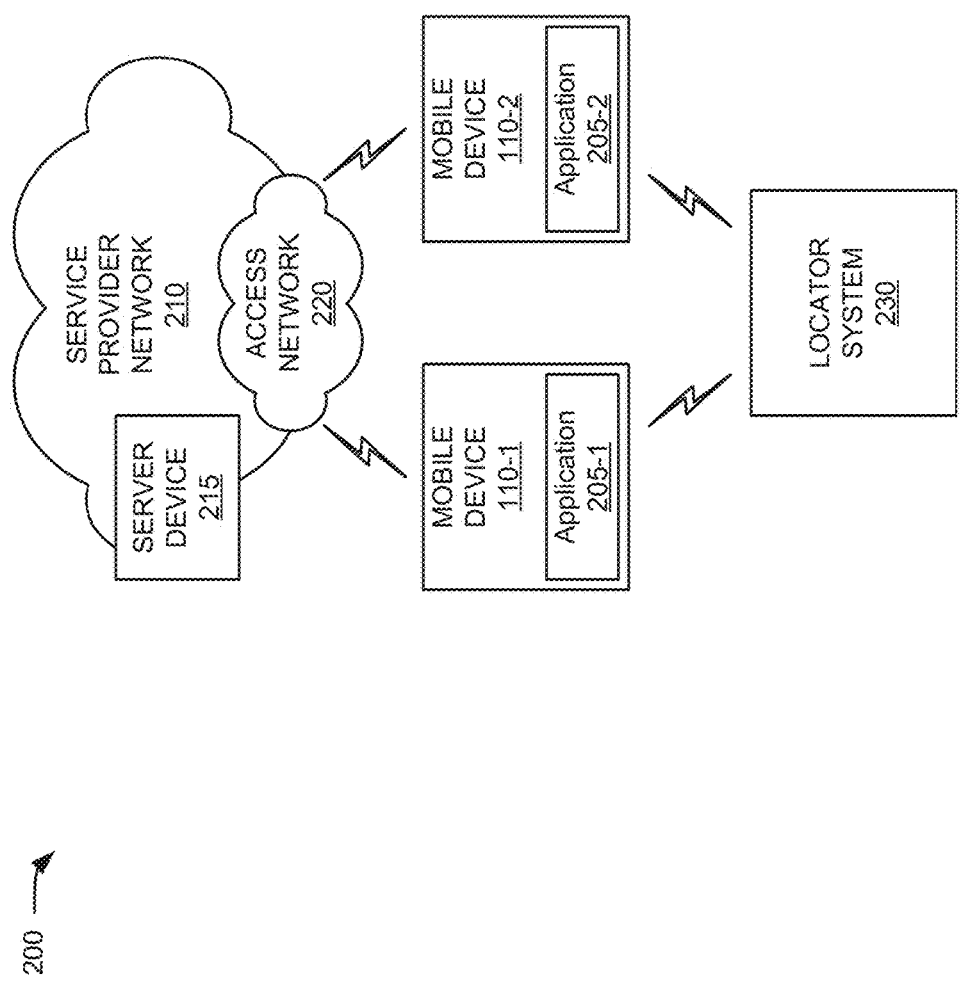

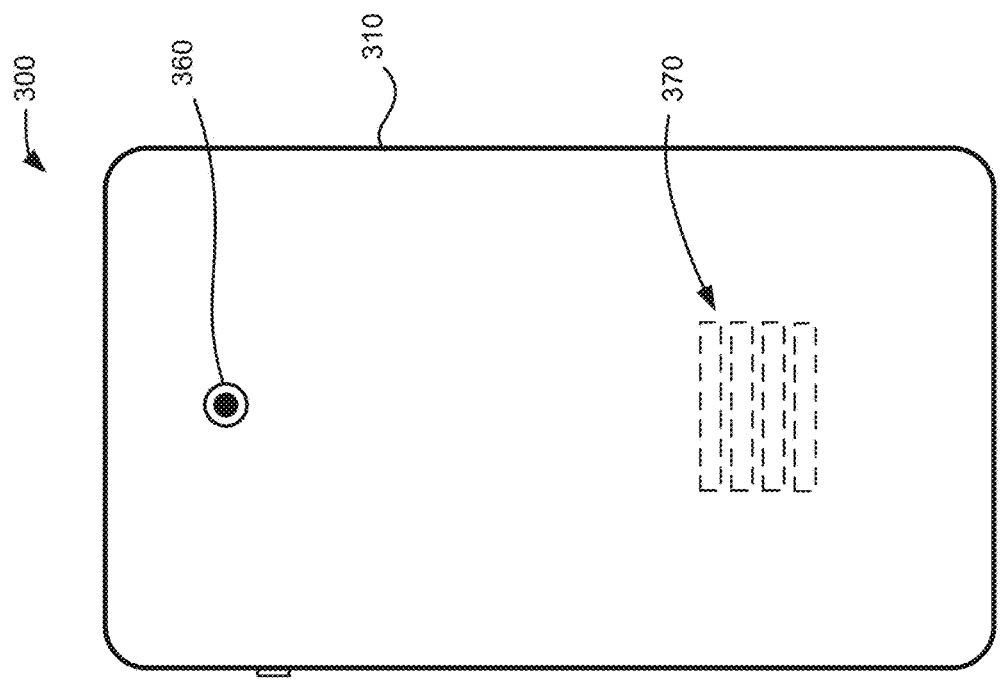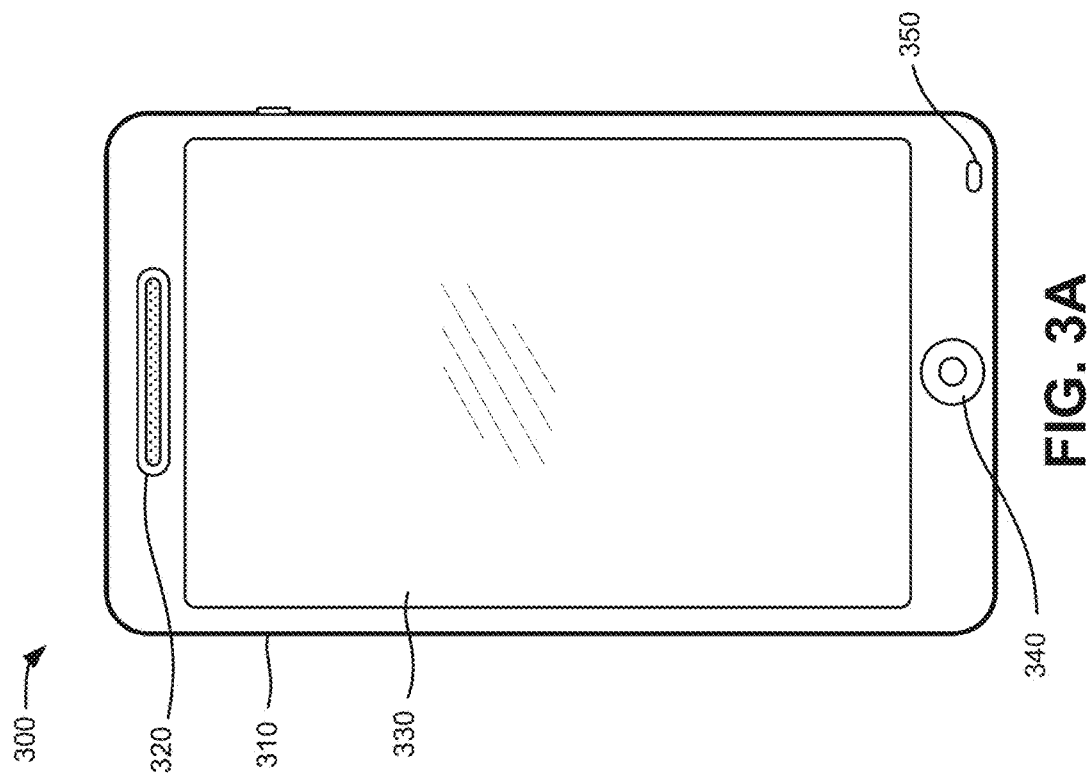

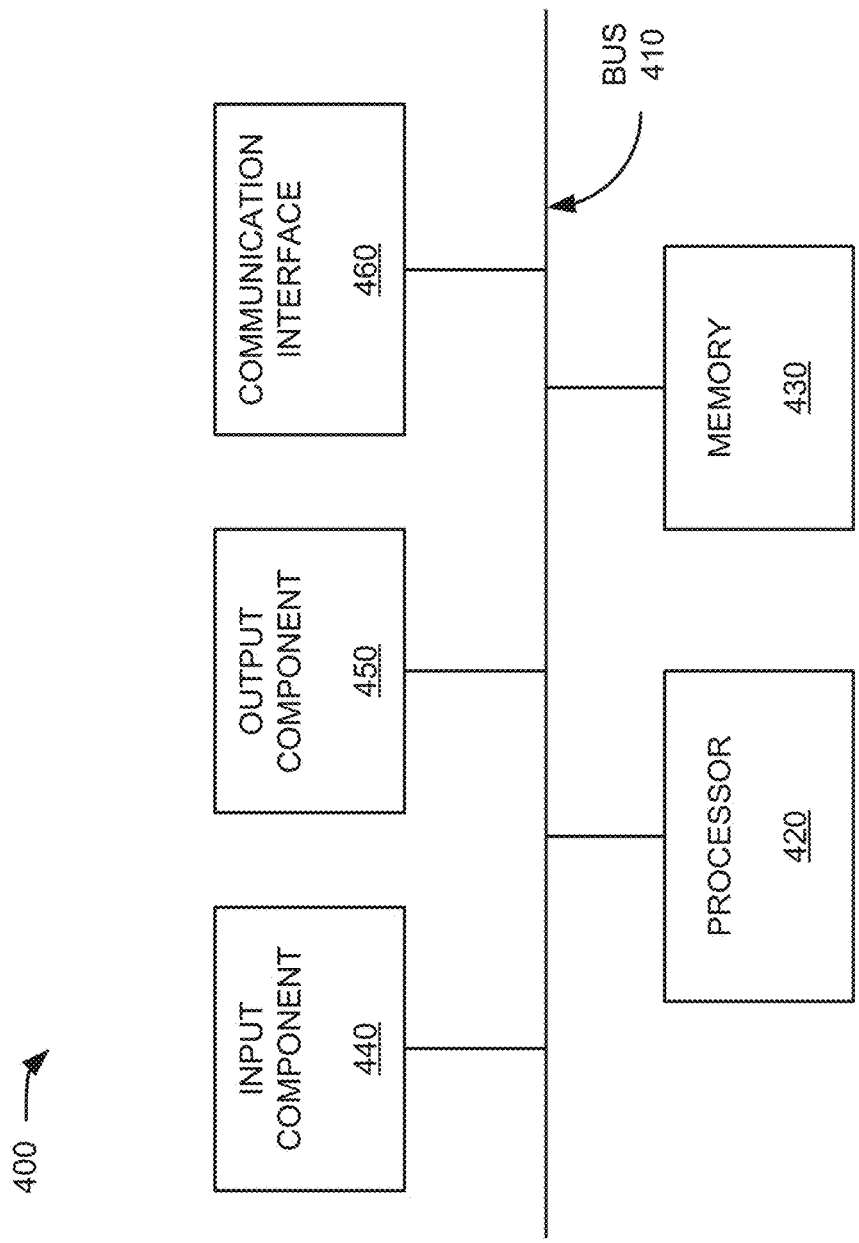

FOREGROUND IDENTIFICATION FOR VIRTUAL OBJECTS IN AN AUGMENTED REALITY ENVIRONMENT

BACKGROUND

Augmented reality refers to the live direct or indirect view of a physical, real-world environment. Augmented reality technology can enhance a user's current perception of reality by supplementing elements of the real-world environment with computer-generated elements such as graphics, video, sound, geographic location data, etc. One challenge when inserting visual computer-generated elements into real-world images or video is to accurately present the virtual object relative to real-world objects in front of the virtual object.

BRIEF DESCRIPTION OF THE DRAWINGS

FIG. 2 is a diagram that depicts an exemplary network environment in which systems and methods described herein may be implemented;

FIGS. 3A and 3B are diagrams of front and rear views, respectively, of the mobile device of FIG. 1, according to an implementation described herein;

FIG. 4 shows a diagram of exemplary components that may be included in a device included in the network environment shown in FIG. 1;

DETAILED DESCRIPTION OF THE PREFERRED EMBODIMENTS

The following detailed description refers to the accompanying drawings. The same reference numbers in different drawings may identify the same or similar elements.

Systems and methods described herein apply visual computer-generated elements into real-world images with an appearance of depth by using information available via conventional mobile devices, such as smart phones. More particularly, the systems and methods described herein use information from common smart phone technology (e.g., a single rear-facing camera, a gyroscope, a magnetometer/compass, an accelerometer, and a location-detection system) to render virtual objects within real-world image feeds and replicate the virtual objects for other users.

Previous attempts to apply virtual objects with depth perspective have required multiple cameras and other sensors to accurately identify an environment and render the virtual objects with the appearance of occupying three-dimensional space. For example, a typical augmented reality system may require information from a deep focus camera, a shallow focus camera, and an infrared sensor. However, most mobile consumer devices are not equipped with such technology, and the addition of these features can drive up the price of the mobile consumer devices.

Figure 1:
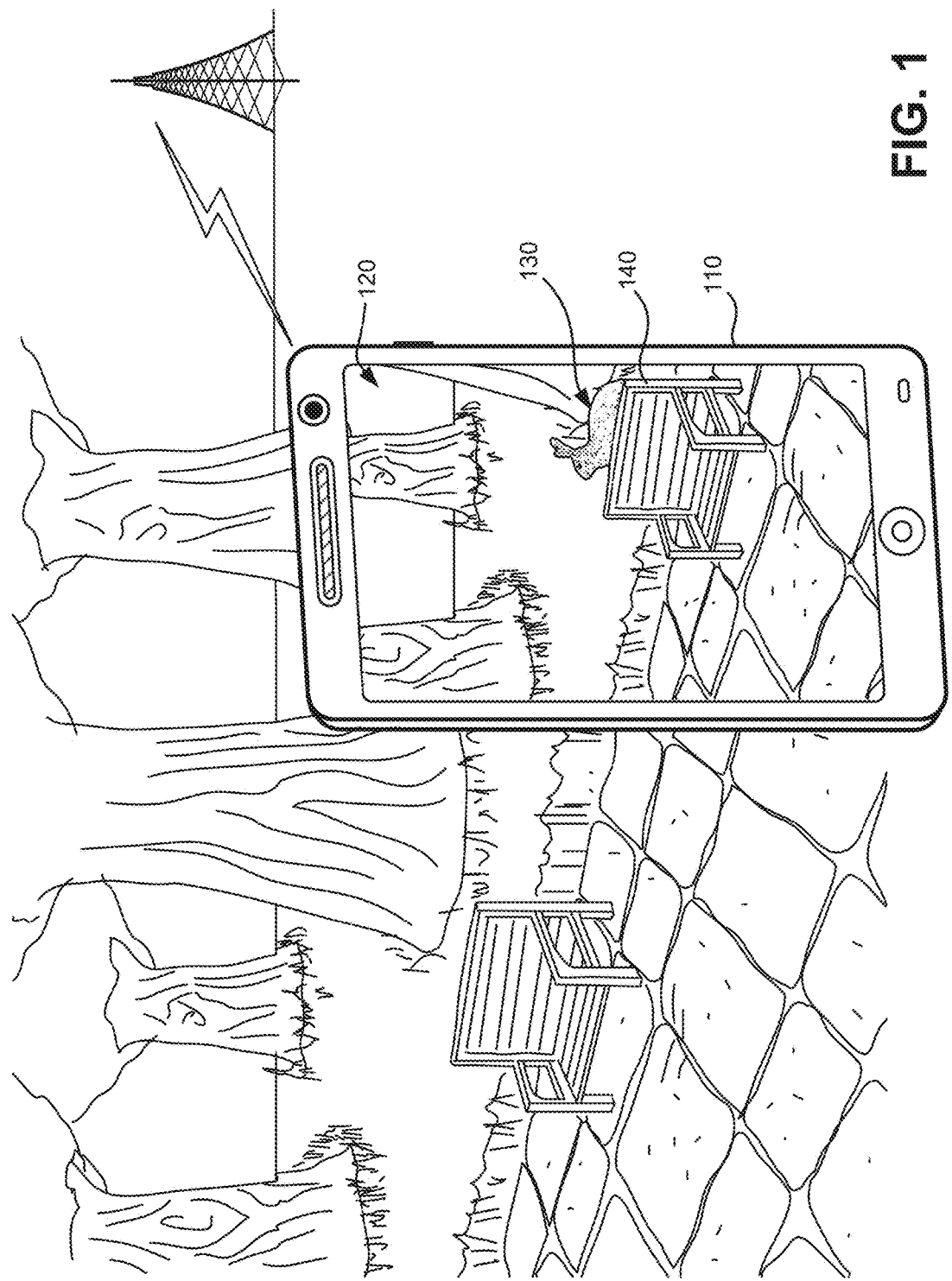
FIG. 1 is a diagram illustrating concepts described herein.

FIG. 1 is a diagram illustrating an implementation described herein. A mobile device 110 (e.g., smart phone, a tablet computer, etc.) may be equipped with an augmented reality (AR) application. Mobile device 110 may use the AR application to capture an image 120 of a real-world environment. The AR application may store image 120 and record a geographic location (or "geo-location"), direction heading, tilt, etc., of mobile device 110 at the time of capturing image 120. Image 120 may be referred to as a "reference image," and the geographic location, direction heading, tilt, etc., of mobile device 110 may generally be referred to as "reference image data."

A user of mobile device 110 may use the AR application to insert a virtual object 130 into reference image 120. Using feature recognition technology, mobile device 110 or a backend system (not shown in FIG. 1) may identify one or more features 140 in reference image 120. A "feature" may be a unique set of pixels included in image 120. The feature may be an object, a portion of an object, or some other group or set of pixels that are a part of image 120 (e.g., in whole or in part). Features may be tracked between images and can be considered somewhat predictable for changes between sequential images. For example, a park bench may be a feature identified by the feature recognition technology. In another implementation, a user may assist with feature recognition, for example, by tracing an outline of a particular feature.

As described further herein, the user of mobile device 110 may select one or more features 140 within image 120 as foreground features that will be presented "in front of" virtual object 130. Virtual object 130 may then be placed on a placement screen relative to the foreground feature (e.g., behind feature 140 in FIG. 1) and defined with a size and orientation by the user. Thus, the virtual object 130 may be rendered having an appearance of depth (e.g., a virtual rabbit partially occluded by a park bench). The object type, size, virtual location, and associated features may be referred to as an "object definition."

The reference image, reference image data, and object definition may be provided to the backend system. The backend system may store the reference image, reference image data, and object definition. Another mobile device with the AR application may later be positioned in the same position (also referred to herein as a reference position) indicated in the reference image data. When the other mobile device is detected in the reference position, the other mobile device may provide a video feed and attempt (possibly with the assistance of the backend system) to detect feature(s) 140. When a match is detected, the other mobile device may be instructed to present virtual object 130 according to the object definition.

FIG. 2 is a diagram illustrating an exemplary network environment 200 in which systems and methods described herein may be implemented. As illustrated, network environment 200 may include mobile devices 110-1 and 110-2 (referred to generically as "mobile device 110" and collectively as "mobile devices 110"), a service provider network 210 including a server device 215, an access network 220, and a locator system 230. Components of network environment 200 may be connected via wired and/or wireless links.

Mobile device 110 may include a portable communication device (e.g., a mobile phone, a smart phone, a tablet device, a global positioning system (GPS) device, and/or another type of wireless device); a laptop (e.g., with a wireless air card) or another type of portable computer; a portable gaming system; and/or any other type of mobile computer device with communication and output capabilities. In one implementation, mobile device 110 may include a camera and one or more sensors to capture additional information regarding a user or a surrounding environment of mobile device 110. For example, mobile device 110 may include a location sensor, such as a sensor to receive a GPS or other location data, or a component to dynamically determine a location of mobile device 110. As another example, mobile device 110 may include an accelerometer, magnetometer, gyroscope, etc.

Mobile device 110 may operate according to one or more wireless communication standards such as broadband cellular standards (e.g., long-term evolution (LTE) network, wideband code division multiple access (WCDMA), etc.), local wireless standards (e.g., Wi-Fi®, Bluetooth®, near-field communications (NFC), etc.), or according to other communications standards.

In one implementation, mobile device 110 may be provided with one or more applications 205-1 and 205-2 (e.g., an AR application, referred to generically as "AR application 205") to generate and present virtual objects in real-world images. AR application 205 is described further in connection with, for example, FIGS. 5-7C.

Service provider network 210 may include network devices that provide telecommunications services and provide a backend system for supporting features of mobile devices 110. Service provider network 210 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), the Internet, or a combination of networks. Service provider network 210 may include, for example, one or more private Internet Protocol (IP) networks that use a private IP address space. Although shown as a single element in FIG. 2, service provider network 210 may include a number of separate networks. Service provider network 210 may permit mobile devices 110 to download applications (e.g., AR application 205) and transfer data (e.g., reference images, reference image data, and object definitions) to support augmented reality services.

According to an implementation, service provider network 210 may include a mobile access network 220 that transfers/receives information (e.g., voice, data, broadband applications, etc.) to/from a circuit-switched and/or packet-switched network. As an example, mobile access network 220 may include an LTE network, a Code Division Multiple Access (CDMA) network, a Wi-Fi network (e.g., using IEEE 802.11 standards), or another access network (e.g., an E-UTRAN, an enhanced high-rate packet data (eHRPD) network, or another 3G, 4G, or future wireless networks).

Server device 215 may include a network or computing device. Server device 215 may provide backend processing to support functions of AR application 205, such as placement of virtual objects and presentation of virtual objects. For example, server device 215 may receive a reference image captured from a camera on mobile device 110-1, along with reference image data (e.g., a geo-location, a direction heading, and a tilt indication) collected contemporaneously with the reference image. In one implementation, server device 215 may generate a simplified model of the reference image (using, for example, feature recognition and/or edge detection techniques). Server device 215 may receive an object definition from mobile device 110-1 and may store the virtual object definition associated with the reference images, the reference image data, and the simplified model of the reference image. Some or all of the stored object definition, the reference image data and/or the simplified model may be accessible to other mobile devices using AR application 205.

In one implementation, server device 215 may also receive, from mobile device 110-2, a video feed when mobile device 110-2 is in the reference position of mobile device 110-1. Server device 215 may detect a match of features between an image from the video feed and the features indicated in the object definition, and may instruct mobile device 110-2 to present the virtual object relative the previously-indicated foreground features when the match is detected.

Locator system 230 may include a satellite GPS, a cellular tower triangulation system, a WLAN access point locating system, a global navigation satellite system (GNSS), or another system that determines real-time (or near real-time) location information for subscribing devices, such as mobile device 110. In one implementation, locator system 230 may include a satellite to broadcast information to mobile device 110. In another implementation, locator system 230 may include one or more other systems (e.g., a location information server) to gather/provide information about the position, direction, and/or destination of mobile device 110.

In FIG. 2, the particular arrangement and number of components of network environment 200 are illustrated for simplicity. In practice there may be more mobile devices 110, service provider networks 210, server devices 215, access networks 220, and locator systems 230. For example, there may be millions of mobile devices 110.

FIGS. 3A and 3B show an exemplary communications device 300 that may correspond to mobile device 110. FIGS. 3A and 3B include a front view and back view, respectively, of communications device 300. As shown in FIGS. 3A and 3B, communications device 300 may include a housing 310, a speaker 320, a display screen 330, control button(s) 340, a microphone 350, camera element 360, and/or sensors 370.

Housing 310 may include a chassis via which some or all of the components of communications device 300 are mechanically secured and/or covered. Speaker 320 may include a component to receive input signals from communications device 300 and transmit audio output signals, which communicate audible information to a user of communications device 300.

Display screen 330 may include a component to receive input signals and present a visual output in the form of text, images, videos and/or combinations of text, images, and/or videos. In one implementation, display screen 330 may selectively present a real-world image (e.g., image 120), an augmented reality image (e.g., image 120 with virtual object 130) and/or present a user interface to place a virtual object. In one implementation, display screen 330 may correspond to a touch screen that includes a component to detect an input. For example, display screen 330 may include a pressure sensor to detect touch for inputting content to touch screen 330. Alternatively or additionally, display screen 330 may include a capacitive or field sensor to detect a touch or proximity of the user or an input device to display screen 330.

Control buttons 340 may include one or more buttons that accept or otherwise detect an input from the user (e.g., the user presses a control button or combinations of control buttons) and send electrical signals to a processor (not shown) that may cause communications device 300 to perform one or more operations. For example, control buttons 340 may be used to cause communications device 300 to perform operations related to closing an application or switching between applications being executed on communications device 300. Microphone 350 may include a component to receive audible information from a user and send, as output, a signal transmitted to another user device, or cause the device to perform one or more operations.

Camera element 360 may include a component to receive, as input, optical signals and send, as output, a digital image or video that can be, for example, viewed on display screen 330, stored in the memory of communications device 300, discarded and/or transmitted to another communications device 300. Camera element 360 may include a rear-facing lens on a back side of communications device 300 (i.e., facing an opposite direction to display screen 330) and, optionally, another camera lens may be provided on a front side of communications device 300. The rear-facing lens may include, for example, a fixed-focus camera lens. In one implementation, camera element 360 may capture image data, and communication device 300 may identify its location based on the captured image data.

Sensors 370 may include any types of sensors used to provide information to mobile device 110 (e.g., contemporaneously with collection of optical signals by camera element 360). Sensors 370 may include, for example, rotation sensors (e.g., a gyroscope that detects roll, pitch, and yaw), motion sensors (e.g., an accelerometer), and/or magnetic field sensors (e.g., a magnetometer). Data from sensors 370 may be associated with a new reference image or used to identify a position associated with an existing reference image. For example, data from sensors 370 may be collected when a user selects a reference image 120 for inserting a virtual object 130. Additionally, data from sensors 370 may be applied to help identify when another mobile device is in a reference position to view a virtual object previously placed in virtual space via a different mobile device 110.

FIG. 4 is a diagram illustrating exemplary components of a device 400. Device 400 may correspond, for example, to a component of mobile device 110, server device 215, or another device in network environment 200. Alternatively or additionally, mobile device 110, server device 215, or the other devices in network environment 200 may include one or more devices 400 and/or one or more components of device 400.

Device 400 may include a bus 410, a processor 420, a memory 430, an input component 440, an output component 450, and a communication interface 460. Bus 410 may include a path that permits communication among the components of device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420. Input component 440 may include a mechanism that permits a user to input information to device 400, such as a keyboard, a keypad, a button, a switch, etc. Output component 450 may include a mechanism that outputs information to the user, such as a display, a speaker, one or more light emitting diodes (LEDs), etc.

Communication interface 460 may include a transceiver that enables device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of radio frequency (RF) signals. For example, communication interface 460 may include one or more antennas to transmit and/or receive RF signals over the air. Communication interface 460 may, for example, receive RF signals and transmit them over the air to mobile device 110/access network 220, and receive RF signals over the air from access network 220/mobile device 110. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Device 400 may perform certain operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. Alternatively, hard-wired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer components, additional components, different components, or differently arranged components than those depicted in FIG. 4. For example, device 400 may include one or more switch fabrics instead of, or in addition to, bus 410. Additionally, or alternatively, one or more components of device 400 may perform one or more tasks described as being performed by one or more other components of device 400.

Figure 5:
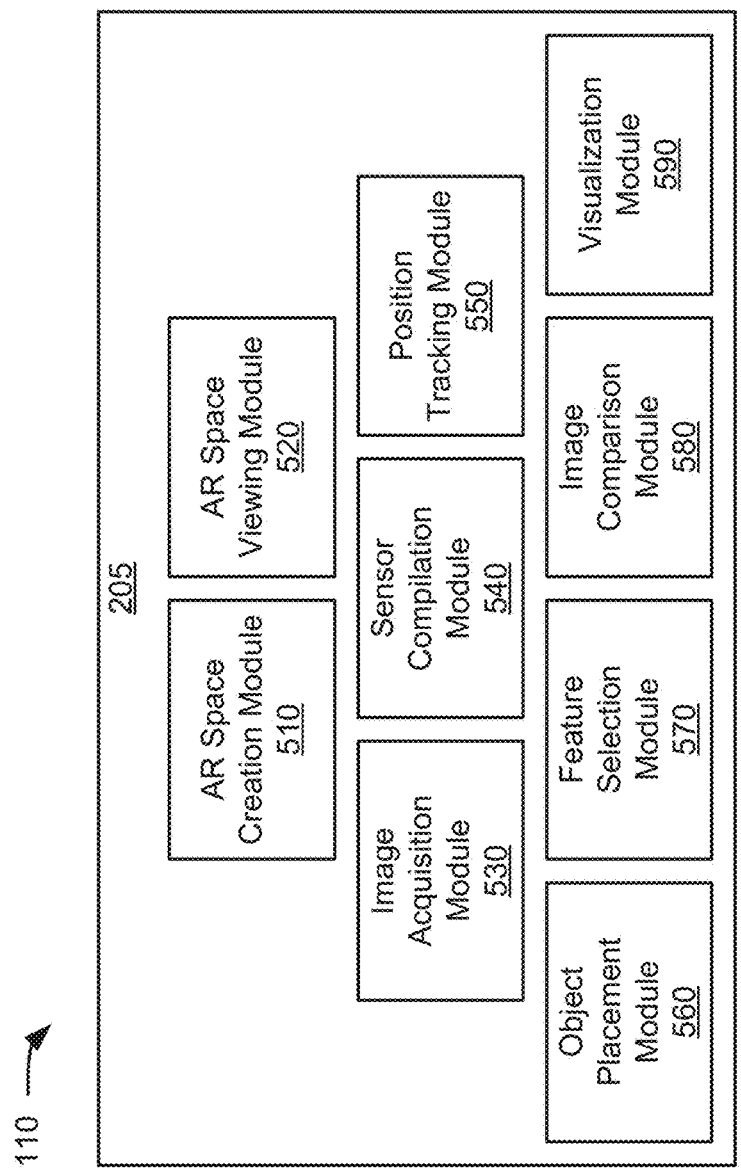
FIG. 5 is a block diagram illustrating exemplary functional components of the mobile device of FIG. 1.

FIG. 5 is a block diagram illustrating exemplary functional components of mobile device 110. As shown in FIG. 5, mobile device 110 may include AR application 205 with an AR space creation module 510, an AR space viewing module 520, an image acquisition module 530, a sensor compilation module 540, a position tracking module 550, an object placement module 560, a feature selection module 570, an image comparison module 580, and a visualization module 590. Functions of AR space creation module 510, AR space viewing module 520, image acquisition module 530, sensor compilation module 540, position tracking module 550, object placement module 560, feature selection module 570, image comparison module 580, and visualization module 590 may be performed, for example, by processor 420.

AR application 205 generally provides a user interface to define an AR space and place virtual objects (e.g., AR space creation module 510) and another user interface to detect the AR space and view the virtual objects (e.g., AR space viewing module 520). AR space creation module 510 may provide user interfaces, processing, and communications with server device 215 to enable a user to place a virtual object (e.g., virtual object 130) with the appearance of depth behind one or more selected features (e.g., feature 140) of real-world images. AR space viewing module 520 may provide user interfaces, processing, and communications with server device 215 to enable a user (e.g., with a different mobile device 110) to view the virtual object placed by a previous user. AR space creation module 510 and AR space viewing module 520 may interact with other functional modules of AR application 205 to place and present virtual objects in real-world images.

Figure 6:
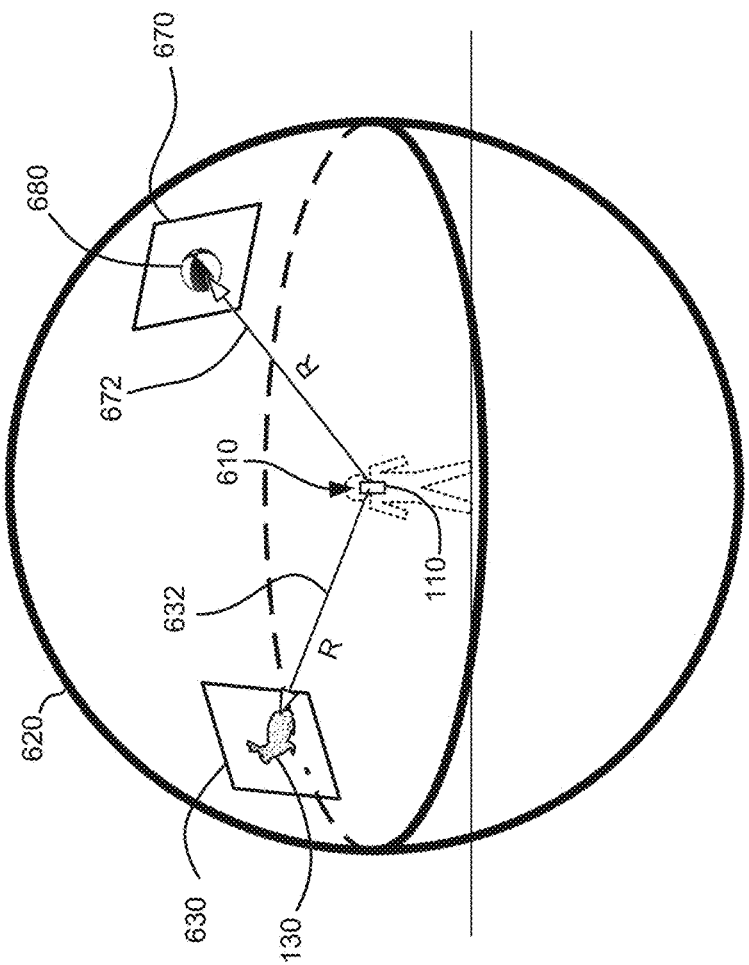
FIG. 6 is a diagram of an augmented reality sphere, according to an implementation described herein.
Figure 7A:
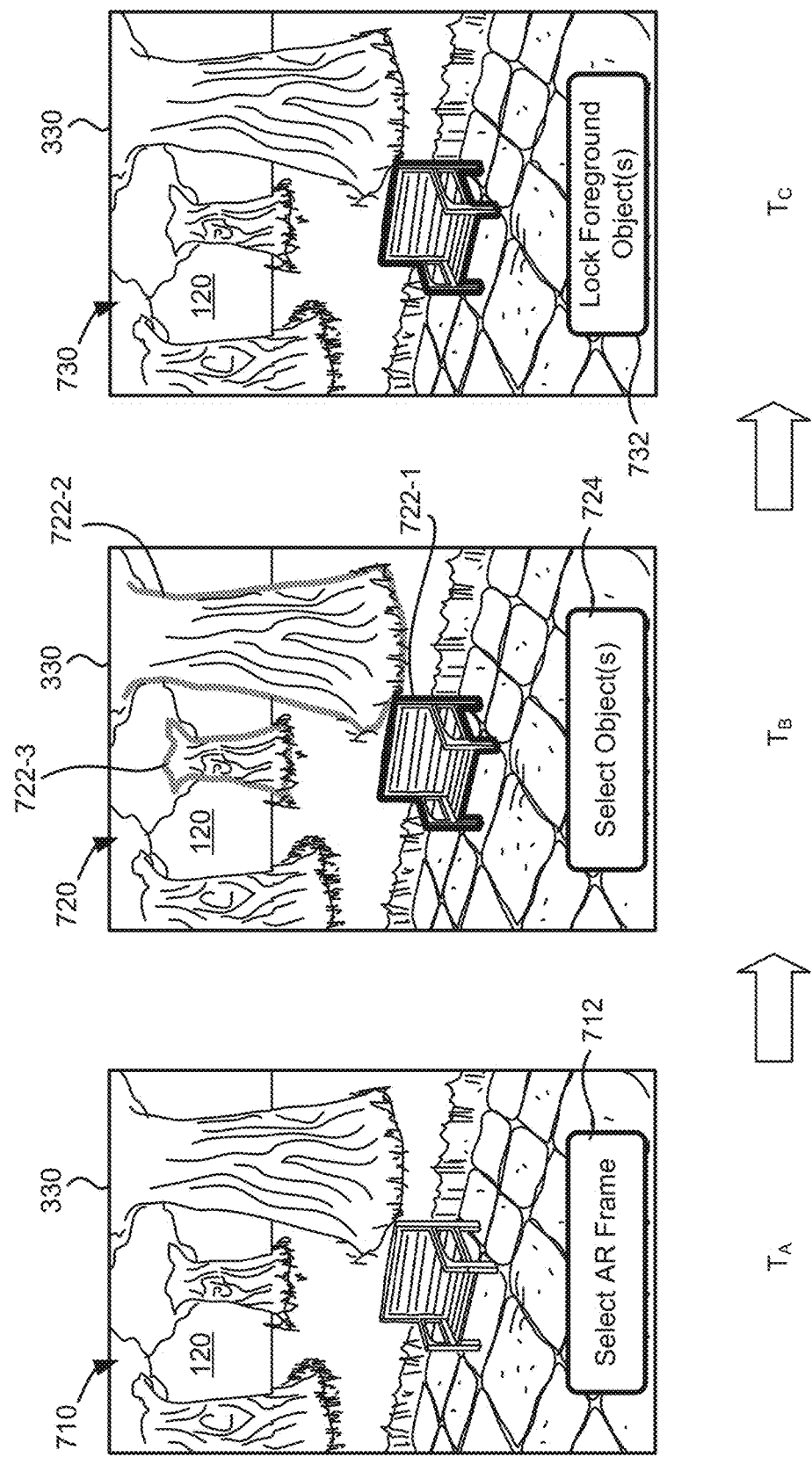
FIG. 7A-7C are diagrams illustrating placement of a virtual object within a reality image using feature recognition.
Figure 7B:
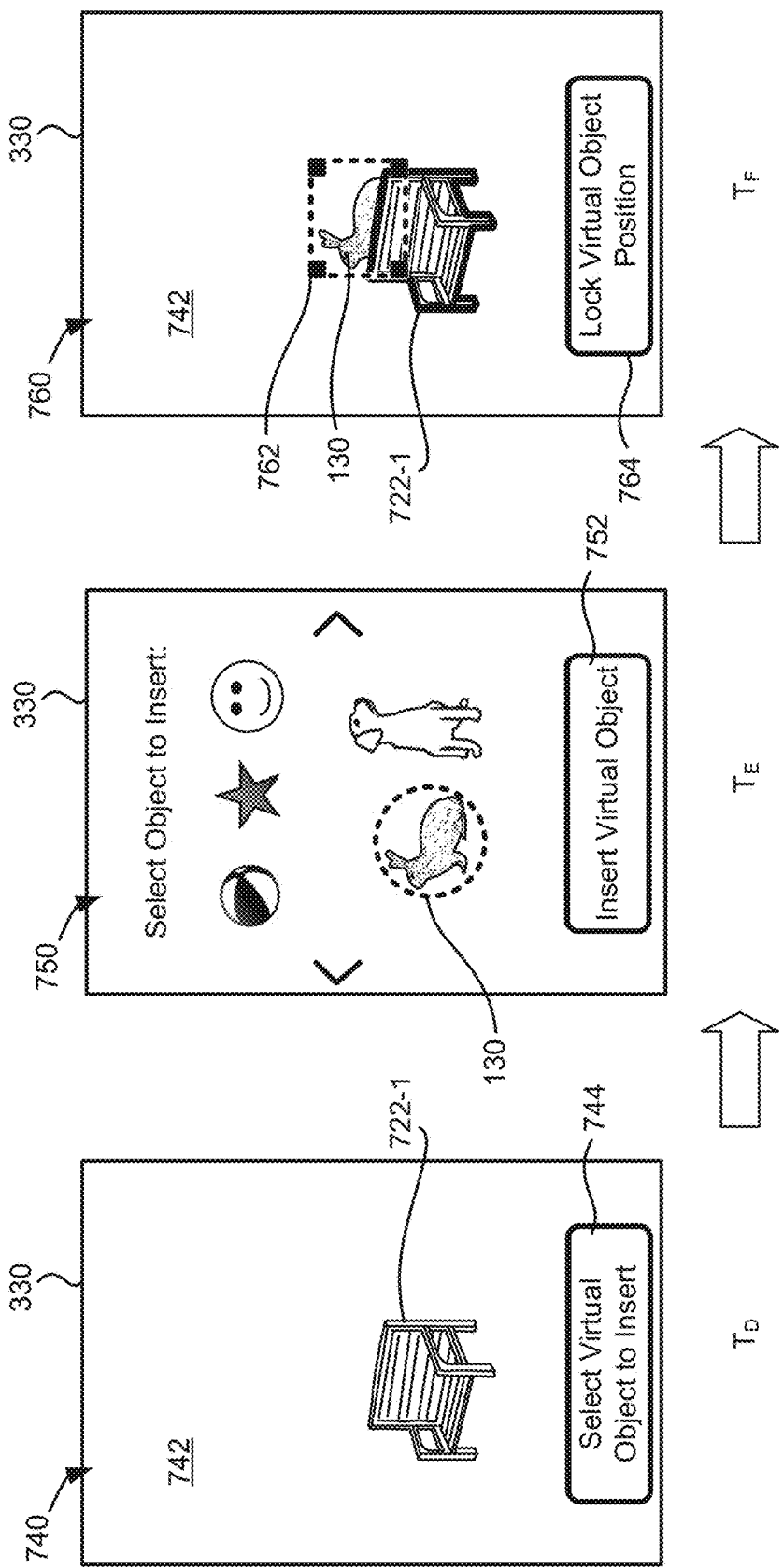
Figure 7C:
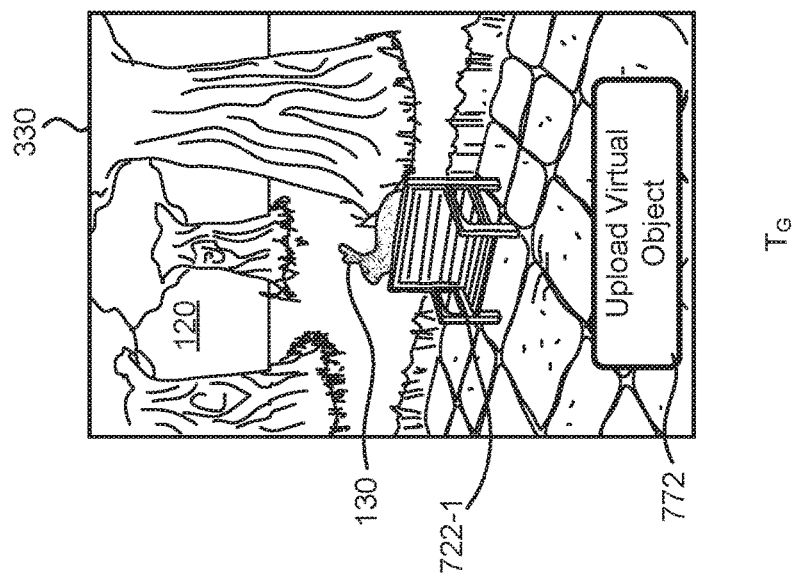

Some of the descriptions of the functional modules of AR application 205 shown in FIG. 5 are illustrated below with reference to FIGS. 6 and 7A-7C. FIG. 6 provides an illustration of a reference position for an AR space, according to an implementation described herein. FIGS. 7A-7C are illustrations of display screen 330 when mobile device 110 is implementing certain features of AR application 205.

Image acquisition module 530 may collect images (e.g., frames of a video feed) from camera element 360 and present the images to a user via display screen 330. As described further herein, images may be used, for example, to indicate placement positions of virtual objects, identify features, and identify proper positioning of mobile device 110.

Sensor compilation module 540 may collect data about mobile device 110 contemporaneous to the acquisition of images, such as reference image 120. When a user selects an image for insertion of a virtual object, sensor compilation module 540 may obtain data from sensors 370, location information from locator system 230, and/or other data pertaining to an orientation/position of mobile device 110 at the time of capturing the image. For example, sensor compilation module 540 may collect a geographic location, a direction heading, and tilt angles (e.g., roll, pitch, and yaw) of mobile device 110 at the time reference image 120 is captured. In another implementation, sensor compilation module 540 may collect data from sensors 370 contemporaneously with frames of a live video feed.

Position tracking module 550 may apply information from sensor compilation module 540 and/or locator system 230 to track a location and orientation of mobile device 110. For example, position tracking module 550 may track mobile device 110 from an initial position (e.g., when capturing an image to designate or unlock an AR space) to a subsequent position relative to the initial position.

Object placement module 560 may provide a user interface to allow a user of mobile device 110 to select a point of reference for a virtual object in an AR space. For example, object placement module 560 may allow a user to identify a reference position 610 for an AR space 620, as illustrated in FIG. 6. In one implementation, reference position 610 may correspond to the geo-location, directional heading, and tilt of mobile device 110 for viewing reference image 120. In another implementation, reference position 610 may correspond to the geo-location, directional heading, and tilt of mobile device 110 for viewing a different image (e.g., an image that would not include presentation of a virtual object). AR space 620 may have a fixed radius, R, extending from reference position 610. In one implementation, radius R may include a default value (e.g., 15 feet, 30 feet, etc.) provided with AR application 205. In another implementation, radius R may be selected based on a size or type of virtual object 130 selected by a user. AR space 620 is a mathematical construct for use by AR application 205/server device 215 and may not be seen by a user of mobile device 110.

According to one aspect, each virtual object may be projected as a two-dimensional rendering, at a location selected by a user of mobile device 110, on a plane that is tangential to a sphere of radius R. For example, as shown in FIG. 6, virtual object 130 may be a two-dimensional rendering at radius R (from mobile device 110) within plane 630. Plane 630 may be orthogonal to a line 632 that extends along radius R (from mobile device 110) to a center of virtual object 130. Similarly, another virtual object 680 may be a two-dimensional rendering at radius R within plane 670. Plane 670 may be orthogonal to a line 672 that extends along radius R to a center of virtual object 680. As described above with respect to virtual object 130, a user of mobile device 110 may position virtual object 680 as a two-dimensional rendering with the desired size, position, and orientation within plane 670.

A collection of the reference image 120, the reference image data, radius R, and any virtual object definitions (e.g., for virtual objects 130/680, etc.) may be referred to herein as an "AR space." Each AR space may be stored locally on mobile device 110 or in a memory associated with server device 215 (e.g., for sharing with users of other mobile devices).

FIG. 7A provides an example of an image selection for a reference position using object placement module 560. As shown in FIG. 7A, a user may activate AR application 205 to acquire images via a rear-facing camera. Object placement module 560 may present, on an image selection screen 710, a continuous video feed of images from the camera with a Select AR Frame button 712 (or another selection mechanism) to accept a user's selection of a particular frame from the video feed. At a time $T_A$, when the user identifies a particular camera view that is desired for establishing a reference position for an augmented reality space, the user may press Select AR Frame button 712 to acquire the current view as reference image 120. Reference image 120 (along with contemporaneous data from sensor compilation module 540) will be captured and used as a point of reference for an AR space, including for placement of virtual objects (e.g., by mobile device 110-1) and subsequent discovery of the virtual objects (e.g., by mobile device 110-2). According to implementations described herein, zoom functionality of camera element 360 is disabled when AR application 205 is in use.

Feature selection module 570 may identify features of reference image 120 and allow a user to indicate whether one or more features are in the foreground or background relative to a virtual object. Feature selection module 570 may also identify and track features in subsequent images (e.g., from image acquisition module 530). In one implementation, feature selection module 570 may automatically detect one or more features in reference image 120 when reference image 120 is selected as part of a process to place virtual object 130. For example, feature selection module 570 may attempt to match patterns/objects in image 120 against a library of known features (e.g., accessed from service provider network 210). In some instances, the library of known features may include predicted stationary objects (e.g., chairs, tables, windows, benches, bookshelves, signs, tree trunks, etc.), predicted movable objects (e.g., body parts, leaves, clouds, etc.), and questionable objects that may be either moving or stationary objects (e.g., cars, trucks, bicycles, etc.). In another implementation, reference image 120 may be provided to server device 215 for feature detection. Feature selection module 570 may incorporate one or more known object recognition technologies.

In still another implementation, feature selection module 570 may solicit user input to identify a particular feature object. For example, user input to identify a feature may include tracing edges of an object in reference image 120. In one implementation, AR application 205 may provide a user interface screen 720 to edit edges of features or identify edges of new features in reference image 120. For example, as shown in FIG. 7A at time $T_B$, AR application 205 may present screen 720 with a group of highlighted features 722-1, 722-2, and 722-3. A user may select/de-select features 722 by, for example, touching a highlighted edge. User interface screen 720 may also include a Select Object(s) button 724 (or another selection mechanism) to confirm selection of particular features (e.g., feature 722-1). Still referring to FIG. 7A, at time $T_C$, AR application 205 may provide a user interface screen 730 with a Lock Foreground Object(s) button 732 to allow a user to confirm one or more selected features 722 (e.g., feature 722-1) of reference image 120 as foreground objects for insertion of a virtual reality image.

Object placement module 560 may extract the selected foreground feature for presentation to the user. For example, as shown in FIG. 7B at time $T_D$, AR application 205 may provide a user interface screen 740 with the selected foreground feature (e.g., feature 722-1) isolated in a blue-screen setting 742. Blue-screen setting 742 may represent background relative to feature 722-1. User interface screen 740 may also include a Select Virtual Object to Insert button 744 (or another selection mechanism) to provide a catalog of virtual objects available for insertion. Selection of Select Virtual Object to Insert button 744 may cause AR application 205 to provide a selection screen of available virtual objects.

For example, as shown in FIG. 7B at time $T_E$, AR application 205 may present screen 750 with a group of virtual objects available for insertion into blue-screen setting 742 and an Insert Virtual Object button 752 (or another selection mechanism). In one implementation, each virtual object may include (or be linked to) three-dimensional information to permit two-dimensional rendering of the virtual object from different orientations and perspectives (e.g., front, back, side, etc., of the virtual object). In another implementation, virtual objects available for selection may include peer-generated virtual objects which may be uploaded to a catalog of virtual objects using, for example, an application programming interfaces (API). The catalog of virtual objects may be provided to AR application 205, for example, from server device 215. The user may select a particular virtual object (e.g., virtual object 130) from screen 750 and select the Insert Virtual Object button 752 to add virtual object 130 to reference image 120.

Object placement module 560 may allow a user to insert a virtual object behind a designated foreground layer (or between the designated foreground layer and a background layer) of reference image 120. For example, referring to FIG. 7B, upon selection of insert virtual object button 752 at time $T_E$, AR application 205 may present a placement screen 760 with virtual object 130 overlaid on background blue-screen setting 742 in a virtual layer appearing behind selected foreground feature 722-1. As shown in FIG. 7B at time $T_F$, placement screen 760 may present virtual object 130 with an editing box 762 to accept user input. In one implementation, a user may position virtual object 130/editing box 632 within placement screen 760 to partially obscure virtual object 130 by feature 722-1. In one implementation, editing box 762 may include "handles" or selectable portions to allow a user to indicate a change in size, a rotation, or a change in three-dimensional perspective of virtual object 130. Once a user has positioned virtual object 130 with the desired size, position, and orientation, the user may select a Lock Virtual Object Position button 764 to complete user input for insertion of virtual object 130.

As shown in FIG. 7C at time $T_G$, AR application 205 may present virtual object 130 as an overlay over reference object 120 but with the appearance of being occluded by feature 722-1. A user may select an Upload Virtual Object button 772 (or another selection mechanism) to store an object definition for virtual object 130. AR application 205 may store the position of virtual object 130 relative to feature 722-1 (and/or other features) of reference image 120 as part of an object definition for virtual object 130. Sensor data from sensor compilation module 540, collected contemporaneously with the user's selection reference image 120 at time $T_A$, may complete an object definition for virtual object 130. Each object definition may be stored locally on mobile device 110 and/or in a memory associated with server device 215 (e.g., for sharing with users of other mobile devices). In another implementation, multiple virtual objects may be associated with the same reference position (e.g., within AR space 620). The virtual object definition may essentially allow virtual object 130 to be attached to a portion of AR space 620 relative to the reference position 610.

Returning to FIG. 5, image comparison module 580 may receive reference images (e.g., video image sequences) from image acquisition module 530, along with geographic location and sensor data from sensor compilation module 540. When image comparison module 580 identifies that mobile device 110 is in the same geographic location and in a similar orientation to what is indicated in a previously-stored virtual object definition, image comparison module 580 may apply matching techniques to match incoming video frames to reference image 120. In one implementation, image comparison module 580 may identify a particular foreground feature (e.g., feature 722-1) in a frame of the video feed. In another implementation, image comparison module 580 may compare features of sequential images over time to detect movement of mobile device 110.

Visualization module 590 may receive rendering information from server device 215 and present virtual objects on display screen 330 of mobile device 110. When mobile devices 110 is identified at the reference position (e.g., reference position 610), visualization module 590 may receive rendering information for virtual object 130 (and virtual object 680) and present virtual objects 130/680 on mobile device 110-1 or 110-2 when the orientation of mobile device 110 corresponds to the object definition for the virtual object 130/680. For example, visualization module 590 may receive a match indication from server device 215 that a combination of an image, location data, and sensor data for mobile device 110-2 corresponds to a reference position and reference image (a "virtual object trigger") created by mobile device 110-1 for virtual object 130. Visualization module 590 may then present virtual object 130 on mobile device 110-2 when mobile device 110-2 is aligned according to the object definition for virtual object 130. In one aspect, as shown in FIGS. 1 and 7C, visualization module 590 may render virtual object 130 so that virtual object 130 is not overlaid on the foreground feature (e.g., feature 140/722-1) in the video feed. Thus, some portions of virtual object 130 (e.g., portions that would overlap edges of feature 722-1) would not be presented to give an appearance of depth in virtual object 130.

When visualization module 590 detects turning/tilting of mobile device 110-2 from the reference position to a secondary orientation, visualization module 590 may receive rendering information for virtual object 680 and present virtual object 680 on mobile device 110-2. The trigger to present virtual image 680 may be based on sensor data (e.g., indicating an orientation) of mobile device 110 without using a second reference image. Thus, no image matching would be required for rendering virtual object 680 (or any other object tied to the same AR space 620) after a first image match is found. Additionally, or alternatively, visualization module 590 may detect a foreground feature from the object definition for virtual object 680, and visualization module 590 may render virtual object 680 so that virtual object 680 is not overlaid on the foreground feature (e.g., feature 722-1) in the video feed. In another implementation, rendering information for virtual object 680 may be provided when AR space 620 is unlocked by mobile device 110, such that the rendering of virtual object 680 may be shown coming into view from an edge of display screen 330 as mobile device 110-1 or 110-2 rotates into the position defined by the object definition of virtual object 680.

Although FIG. 5 shows exemplary components of mobile device 110, in other implementations, mobile device 110 may contain fewer components, additional components, or different components than those depicted in FIG. 5. For example, in one implementation, one version of AR application 205 may include components for virtual object presentation only, and another version of AR application 205 may include components for both placement and presentation of virtual objects. Additionally, or alternatively, one or more functions of mobile device 110 may be performed by (or in conjunction with) server device 215.

Figure 8:
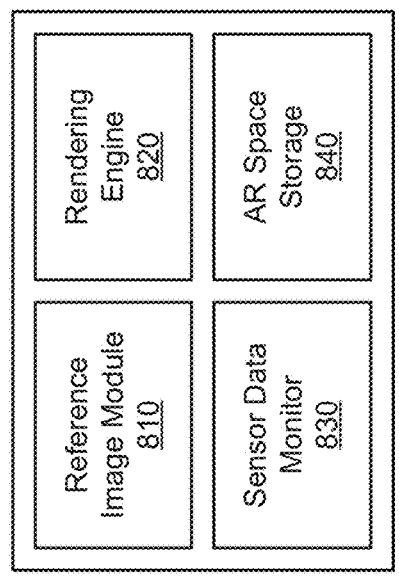
FIG. 8 is a block diagram illustrating exemplary functional components of the server device of FIG. 2.

FIG. 8 is a block diagram illustrating exemplary functional components of server device 215. As shown in FIG. 8, server device 215 may include a reference image module 810, a rendering engine 820, a sensor data monitor 830, and AR space storage 840.

Figure 9:
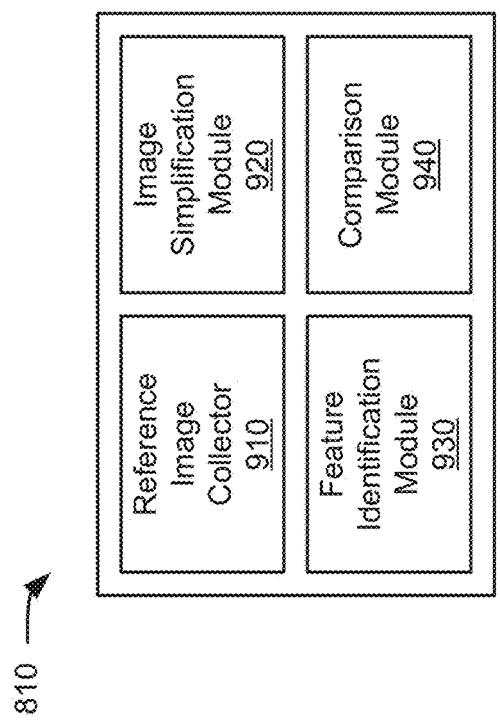
FIG. 9 is a block diagram illustrating exemplary functional components of the reference image module of FIG. 8.

Reference image module 810 may generally receive reference location information to define a reference point for a virtual object with an augmented reality service. Reference image module 810 may also compare subsequent images to identify a starting point of reference for subsequent discovery of the virtual object by other users. Additional details of reference image module 810 are described in connection with FIG. 9. As shown in FIG. 9, reference image module 810 may include a reference image collector 910, an image simplification module 920, a feature identification module 930, and a comparison module 940.

Reference image collector 910 may receive and store a reference image and reference image data from mobile device 110. The reference image may provide a point of reference from which virtual objects (e.g., virtual object 130) may be placed relative to the reference position. Reference image collector 910 may receive, for example, reference image 120 and reference image data from AR application 205. Reference image data may include sensor data obtained by sensors 370 of mobile device 110 contemporaneously with the acquisition of reference image 120. Reference image data may also include geo-location data obtained, for example, by mobile device 110 from locator system 230.

Image simplification module 920 may identify key elements of reference image 120 to simplify matching with subsequent images (e.g., from the same mobile device 110 or another mobile device 110). For example, image simplification module 920 may identify all or a limited number of edges in reference image 120. Edge detection may be performed using edge detection software, such as the Edge Detection and Image Segmentation (EDISON) System. In one implementation, the number of edges used by image simplification module 920 may be based on, for example, a statistically significant number of edges likely to represent a unique image for given location (e.g., reference position 610, as indicated by particular geo-location coordinates, direction heading, and/or tilt). In another implementation, a set of "best" edges may be used based on length, continuity, connectivity, and/or clarity of the edges in reference image 120. For example, image simplification module 920 may extract only straight edges for use in image matching, such that each of the edges may be presented in an angle-distance format.

Feature identification module 930 may perform functions to support, enhance, or replace functions of feature selection module 570 on mobile device 110. Feature identification module 930 may identify features of reference image 120 and subsequent images (e.g., from reference image collector 910). In one implementation, feature identification module 930 may detect one or more features in reference image 120 when reference image 120 is provided (e.g., via image acquisition module 530) as part of a process to place virtual object 130. For example, feature identification module 930 may attempt to match patterns/objects in reference image 120 and subsequent reference images against a library of known features in a manner similar to that described above. In another implementation, feature identification module 930 may use a simplified edge model from image simplification module 920 to detect features.

Comparison module 940 may perform functions to support, enhance, or replace functions of image comparison module 580 on mobile device 110. Comparison module 940 may receive reference images (e.g., video image sequences) from AR application 205, along with geographic location and sensor data for mobile device 110. When comparison module 940 identifies that mobile device 110 is in the same geographic location and in a similar orientation to what is indicated in previously-stored reference image data, comparison module 940 may apply a simplified edge model extracted from reference image 120 to an incoming sequence of reference images. In one implementation, comparison module 940 may perform edge detection of the incoming reference images for comparison with the simplified edge model. In another implementation, a different matching technique may be used to identify a match between an incoming reference image and reference image 120, such as object recognition and feature matching. Comparison module 940 may provide a signal to unlock AR space 620 when a match is identified. The signal may indicate, for example, that the mobile device 110 is in a reference position and that rendering engine 820 may provide instructions for AR application 205 to present a virtual object (e.g., virtual object 130).

Rendering engine 820 may receive a signal (e.g., from comparison module 940) to render a virtual object for presentation on mobile device 110. In one implementation, rendering engine 820 may provide instructions for presenting virtual object 130 on mobile device 110. The size, screen position, and orientation of virtual object 130 when mobile device 110 is in the reference position may correspond to the size, position, and orientation of virtual object 130 as originally provided to server device 215 via object AR application 205 (although virtual object 130 would only be visible when mobile device 110 is in the reference position if the object definition for virtual object 130 corresponds closely to the reference position).

Once mobile device 110 is identified in a reference position (e.g., reference position 610) and an image match is detected, rendering engine 820 may receive additional sensor data from mobile device 110 and apply the sensor data to initiate appropriate rendering of virtual objects (e.g., virtual objects 130/680) within AR space 620. Thus, a compass direction change, tilt, rotation, etc. of mobile device 110 may be reported to rendering engine 820. Based on a comparison of incoming sensor data to the reference position, rendering engine 820 may, for example, detect a secondary orientation match for another virtual object (virtual object 680) and provide instructions for presenting virtual object 680 on mobile device 110.

Sensor data monitor 830 may receive sensor data from AR application 205. In some implementations, sensor data monitor 830 may receive different types of data from AR application 205 depending on the location or settings of mobile device 110. For example, sensor data monitor 830 may receive only location data or no data when mobile device 110 is not at a geo-location corresponding to a reference position for an AR space. When mobile device 110 is at a geo-location corresponding to a reference position for an AR space, sensor data monitor 830 may receive real-time direction, tilt, and/or rotation data. Sensor data monitor 830 may compare data from mobile device 110 with stored reference positions and secondary orientations to detect when mobile device is within an AR space and when mobile device 110 is oriented to view a previously-defined virtual object. When sensor data monitor 830 identifies a match of mobile device 110 orientation and a stored position, sensor data monitor 830 may inform, for example, rendering engine 820.

AR space storage 840 may store AR space definitions (e.g., for AR spaces 620). Each AR space definition may include, for example, a reference image 120, corresponding reference image data, an AR space radius, and virtual object definitions (e.g., with virtual object placement data relative to the reference image data). In one implementation, AR space definitions may also include corresponding simplified edge models. AR space definitions may also include a user list (or access requirements) of other users permitted to access a particular AR space. For example, AR space storage 840 may store AR space definitions from multiple users and store access instructions (e.g., private, public, etc.) for each AR space definition. In one implementation, at least some data fields from AR space storage 840 may be linked to an AR space catalog or listing that may be accessible by users of AR application 205.

Although FIG. 8 shows exemplary components of server device 215, in other implementations, server device 215 may contain fewer components, additional components, or different components than those depicted in FIG. 8. For example, while the functional components of FIG. 8 are shown in connection with server device 215, in some implementations one or more functions described herein may be performed by another device, such a mobile device 110 or another device within service provider network 210.

Figure 10:
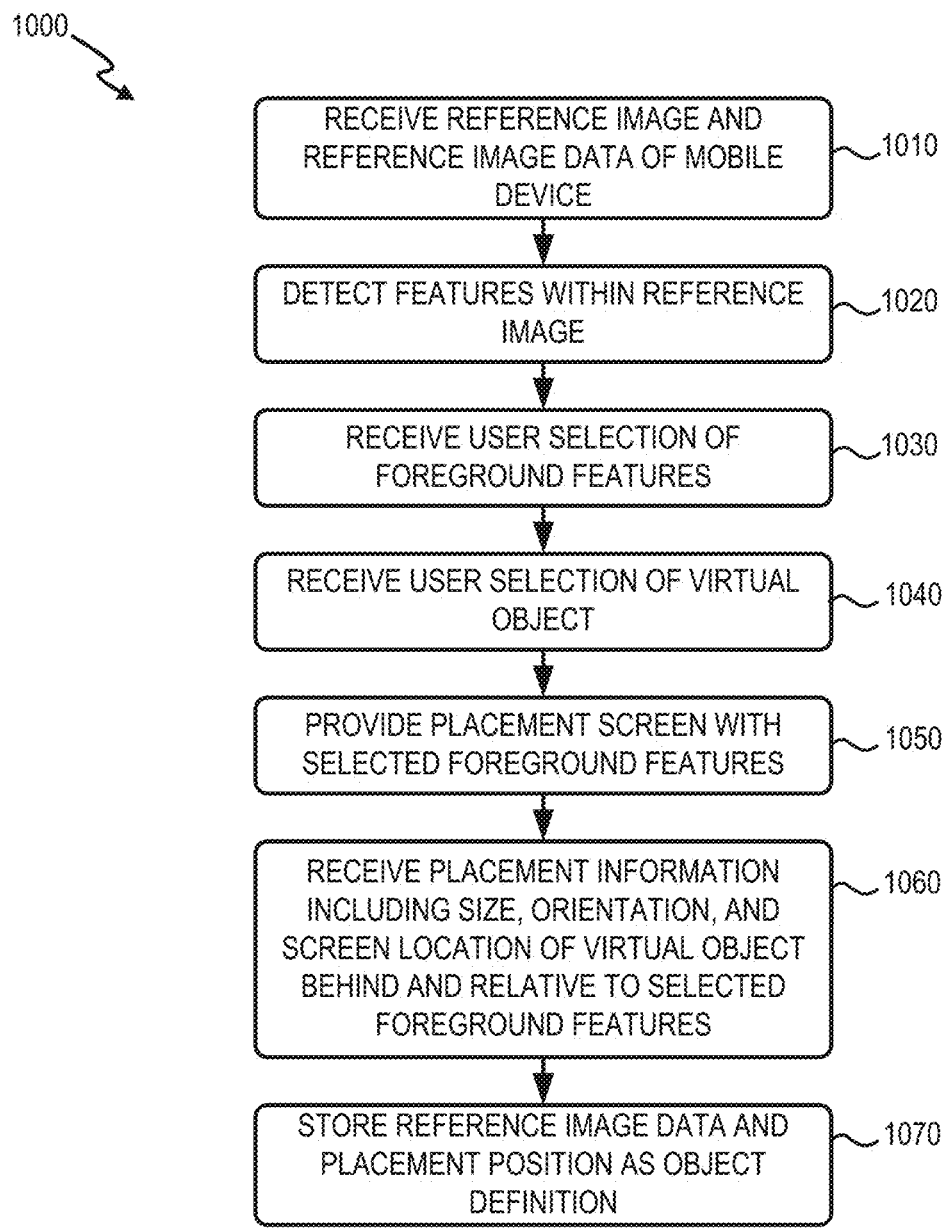
FIG. 10 is a flow diagram that illustrates an exemplary process for placing a virtual object, according to an implementation described herein.

FIG. 10 is a flow diagram illustrating an exemplary process 1000 for placing virtual objects in an augmented reality space. In one implementation, process 1000 may be implemented by server device 215. In another implementation, process 1000 may be implemented by server device 215 in conjunction with one or more other devices in network environment 200, such as mobile devices 110.

Referring to FIG. 10, process 1000 may include receiving a reference image and reference image data of a mobile device (block 1010). For example, AR application 205 on mobile device 110 may collect a reference image 120 selected by a user. AR Application 205 may also collect data about mobile device 110 contemporaneously with the acquisition of reference image 120. The collected data may include a direction heading, tilt, geo-location, etc. associated with the time reference image 120 was captured. Application 205 may forward reference image 120 and the collected data (e.g., reference image data), which may be received by server device 215.

Process 1000 may also include detecting features within the reference image (block 1020) and receiving a user's selection of foreground features (block 1030). For example, as described above, feature identification module 930 of server device 215 and/or feature selection module 570 of mobile device 110 may identify features of reference image 120. In one implementation, server device 215 or mobile device 110 may use object recognition software. In another implementation, a user of mobile device 110 may provide user input to help identify edges and/or objects within reference image 120. As shown in FIG. 7A, AR application 205 may present features from reference image 120 available for selection by the user. The user may select a feature (e.g., feature 722-1) to be in the foreground.

Process 1000 may further include receiving a user's selection of a virtual object (block 1040) and providing a placement screen, for the virtual object, with the selected foreground feature (block 1050). For example, a user may use AR application 205 to insert a virtual object 130 into an adaptation of reference image 120. For example, as described above in connection with FIG. 7B, AR application 205 may present a placement screen 760 with virtual object 130 overlaid on background blue-screen setting 742 in a virtual layer appearing behind selected foreground feature 722-1. Placement screen 760 may present virtual object 130 with an editing box 762 to accept user input for placement, sizing, and orientation of virtual object 130.

Process 1000 may additionally include receiving placement information for the virtual object, including a size, orientation, and screen location of the virtual object relative to the selected foreground features (block 1060), and storing the reference image data and object placement information as an object definition (block 1070). For example, AR application 205 may provide a user interface to receive placement details for virtual object 130. As described in the example of FIG. 7B, a user may position virtual object 130/editing box 762 within placement screen 760 at a desired size, position, and orientation, such as to partially obscure virtual object 130 with feature 722-1. Editing box 762 may include "handles" or selectable portions to allow a user to indicate a change in size, a rotation, or a change in three-dimensional perspective of virtual object 130. As shown in the example of FIG. 7C, AR application 205 may present virtual object 130 as an overlay over reference object 120 but with the appearance of being partially occluded by feature 722-1. AR application 205 may store the position of virtual object 130 relative to feature 722-1 (and/or other features) of reference image 120 as part of an object definition for virtual object 130. Sensor data from sensor compilation module 540, collected contemporaneously with the user's selection reference image 120 at time $T_4$, may complete an object definition for virtual object 130. Each object definition may be stored locally on mobile device 110 or in a memory associated with server device 215 (e.g., for sharing with users of other mobile devices).

Figure 11:
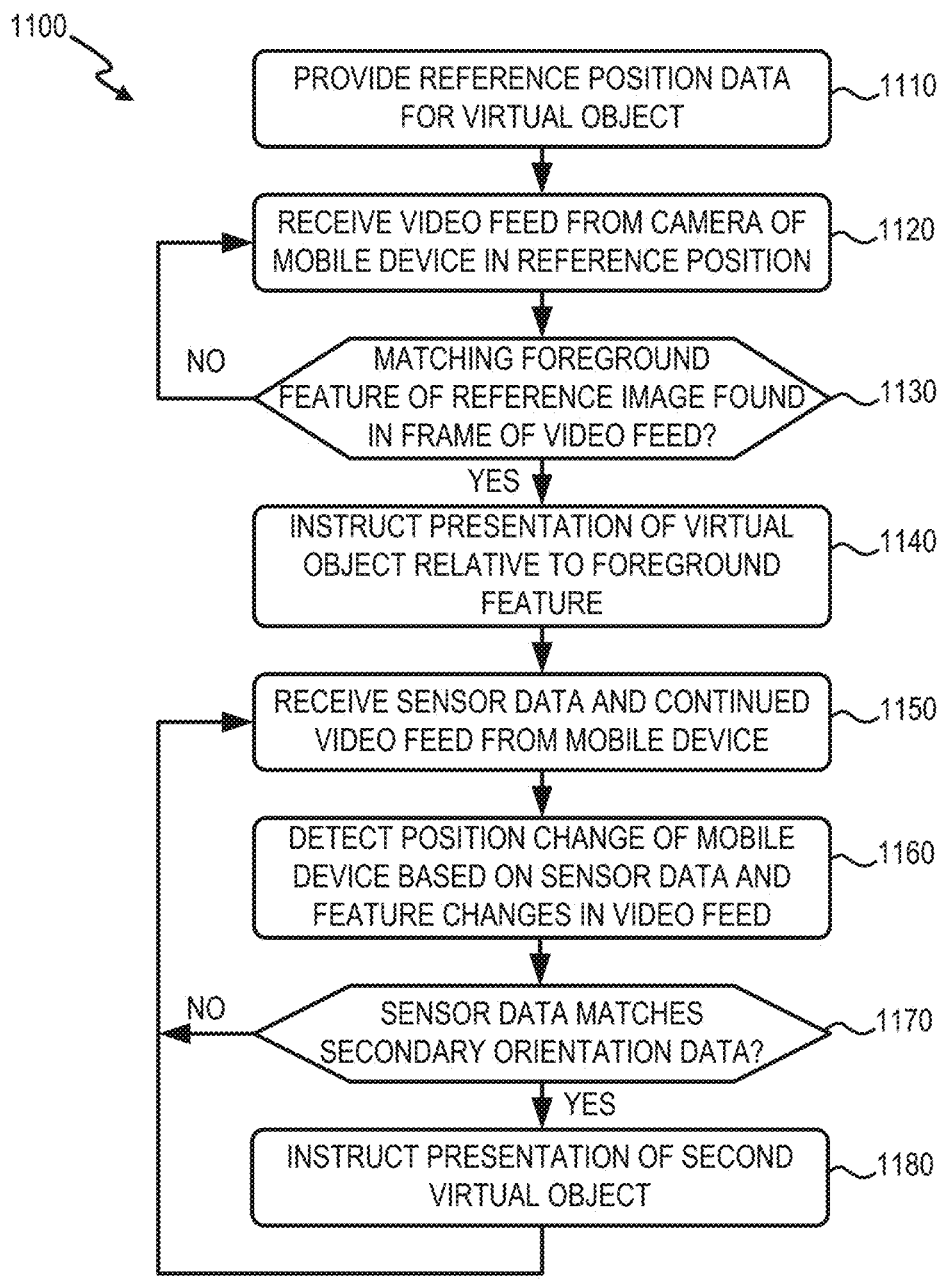
FIG. 11 is a flow diagram that illustrates an exemplary process for presenting a virtual object, according to an implementation described herein.

FIG. 11 is a flow diagram illustrating an exemplary process 1100 for presenting virtual objects in an augmented reality space. In one implementation, process 1100 may be implemented by server device 215. In another implementation, process 1100 may be implemented by server device 215 in conjunction with one or more other devices in network environment 200, such as mobile devices 110. In one implementation, process 1100 may be used to present, on a mobile device 110, a virtual object previously placed in virtual space by a different mobile device 110.

Referring to FIG. 11, process 1100 may include providing reference position data, for a virtual object, to an AR application (block 1110). For example, server device 215 may receive a request from AR application 205-2 (on mobile device 110-2) for coordinates of a virtual object previously generated by AR application 205-1 (e.g., using steps of process flow 1000 above). For example, AR application 205-2 may request information for an AR space previously stored with AR space storage 840. Server device 215 may provide coordinates (e.g., particular geo-location coordinates, direction heading, and/or tilt from reference image data) of a reference position (e.g., reference position 610) to AR application 205-2. In another implementation, server device 215 may publish coordinates of AR spaces in a listing that may be accessible to AR application 205-2.

Process 1100 may include receiving a video feed from a camera of the mobile device (block 1120), and determining if a matching foreground feature of the reference image for virtual object is found in a frame from the video feed (block 1130). For example, once application 205-2 detects that mobile device 110-2 is in reference position 610, image acquisition module 530 may begin to feed video images to server device 215. Server device 215 (e.g., reference image module 810) may receive the video images and identify, in a frame of the video feed, a foreground feature (e.g., feature 722-1) from the reference image 120.

If a matching foreground feature is not found (block 1130—NO), then process 1100 may return to block 1120 to continuing receiving a video feed from the mobile device. If a matching foreground feature of the reference image for virtual object is found (block 1130—YES), process 1100 may include instructing presentation of a virtual object relative to the foreground feature (block 1140). For example, after feature 722-1 is detected in the video feed from mobile device 110-2, rendering engine 820 of server device 215 may provide instructions for mobile device 110-2 to present virtual object 130 relative to feature 722-1.

Process 1100 may also include continuing to receive sensor data and a continuing video feed from the camera of the mobile device (block 1150), and detecting if there is a position change of the mobile device based on the sensor data and feature changes in the video feed (block 1160). For example, assuming mobile device 110-2 stays at the geo-location coordinates of reference position 610, AR application 205-2 may provide sensor data to server device 215, tracking the rotation and/or tilt of mobile device 110-2. Server device 215 (e.g., sensor data monitor 830) may monitor the incoming data for a match of any secondary orientation data within AR space 620, such as secondary orientation data for presenting virtual object 680.

If the additional sensor data does not match any secondary orientation data (block 1170—NO), process 1100 may return to process block 1150. If the addition sensor data matches secondary orientation data (block 1170—YES), process 1100 may include instructing presentation of a second virtual object (block 1180). For example, after sensor data match is detected, rendering engine 820 of server device 215 may provide instructions for mobile device 110-2 to present a second virtual object (e.g., virtual object 680) in accordance with size, position, and orientation in the second virtual object definition.

Systems and methods described herein may apply visual computer-generated elements into real-world images with an appearance of depth by using information available via conventional mobile devices. The systems may receive a reference image and reference image data collected contemporaneously with the reference image. The reference image data may include a geo-location, a direction heading, and a tilt. The systems may identify one or more features within the reference image and receive a user's selection of a foreground feature from the one or more features. The systems may receive a virtual object definition that includes an object type, a size, and an overlay position of the virtual object relative to the foreground feature. The virtual object may be provided in the virtual layer behind the foreground feature. The systems may store, in a memory, the reference image data associated with the virtual object definition for retrieval and presentation to subsequent mobile device users.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 10 and 11, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a computing device, the method comprising:
    receiving a reference image and reference image data collected contemporaneously with the reference image, wherein the reference image data includes a geo-location, a direction heading, and a tilt;
    identifying, for a user of the computing device, one or more features that are available for selection as foreground features within the reference image;
    receiving a user's selection of a foreground feature within the reference image from the one or more features;
    receiving a user's selection of a virtual object from a catalog of virtual objects;
    receiving a user's size and placement information for the virtual object within the reference image where the virtual object and the foreground feature overlap to make the foreground feature appear in front of the virtual object;
    compiling a virtual object definition that includes the selected virtual object, the size, and the placement information of the virtual object relative to the foreground feature, wherein the virtual object is provided in a virtual layer appearing behind the foreground feature within the reference image; and
    storing, in a memory, the reference image data and virtual object definition.

2. The method of claim 1, further comprising:
    providing, to a mobile device, an augmented reality application that includes a user interface to enable a user to select the foreground feature and provide the virtual object definition.

3. The method of claim 1, further comprising:
    receiving, from a mobile device, an indication that the mobile device is in a reference position that corresponds to the reference image data;
    receiving, from the mobile device, a video feed while the mobile device is in the reference position;
    detecting the foreground feature in an image from the video feed; and
    instructing the mobile device to present the virtual object in the virtual layer appearing behind the foreground feature in images from the video feed, when the foreground feature is detected.

4. The method of claim 3, wherein, when instructing the mobile device to present the virtual object, the virtual object is rendered so as to appear at least partially occluded by the foreground feature.

5. The method of claim 3, further comprising:
    providing, to the mobile device, an augmented reality application that includes a user interface to enable the mobile device to obtain the reference image data and the virtual object definition.

6. The method of claim 1, wherein the virtual object is a two-dimensional representation of a three-dimensional object.

7. The method of claim 1, wherein identifying the one or more features within the reference image includes:
    receiving, via a user interface on a mobile device, user input to trace an outline of the one or more features.

8. The method of claim 1, wherein identifying the one or more features within the reference image includes:
    automatically detecting the one or more features from a library of known features.

9. The method of claim 1, wherein receiving the user's selection of the foreground feature within the reference image from the one or more features includes:
    indicating, via a user interface on a mobile device, at least two features of the one or more features; and
    soliciting, via the user interface, user input to identify the foreground feature from the at least two features.

10. The method of claim 1, wherein identifying the one or more features within the reference image comprises:
    detecting the one or more features from a simplified edge model extracted from the reference image.

11. The method of claim 1, wherein the mobile device includes a single camera facing an opposite direction to a display screen, and wherein the computing device includes a server device for a service provider network.

12. A device comprising:
    one or more memories to store instructions; and
    one or more processors to execute the instructions to:
        receive a reference image and reference image data collected contemporaneously with the reference image, wherein the reference image data includes a geo-location, a direction heading, and a tilt;
        identify, for a user of the device, one or more features within the reference image that are available for selection as foreground features;
        receive a user's selection of a foreground feature within the reference image from the one or more features;
        provide, via a user interface, a catalog of virtual objects;
        receive a user's selection of a virtual object from the catalog;
        receive a user's size and placement information for the virtual object within the reference image where the virtual object and the foreground feature overlap to make the foreground feature appear in front of the virtual object;
        compile a virtual object definition that includes the selected virtual object, the size, and the placement information of the virtual object relative to the foreground feature, wherein the virtual object is provided in a virtual layer appearing behind the foreground feature within the reference image; and
        store, in a memory, the reference image data and virtual object definition.

13. The device of claim 12, wherein the one or more processors are further to execute the instructions to:
    receive, from another device, an indication that the other device is in a reference position that corresponds to the reference image data;
    receive, from the other device, a video feed while the other device is in the reference position;
    detect the foreground feature in an image from the video feed; and
    instruct the other device to present the virtual object in the virtual layer appearing behind the foreground feature in images of the video feed, when the foreground feature is detected.

14. The device of claim 13, wherein, when instructing the other device to present the virtual object, the one or more processors are further to execute the instructions to:
    render the virtual object to appear at least partially occluded by the foreground feature.

15. The device of claim 13, wherein the one or more processors are further to execute the instructions to:
provide, to the other device, an augmented reality application that includes a user interface to enable the other device to obtain the reference image data and the virtual object definition.

16. The device of claim 12, wherein, when receiving the user's selection of the foreground feature within the reference image from the one or more features, the one or more processors are further to execute the instructions to:
indicate, via a user interface on the device, at least two features of the one or more features; and
solicit, via the user interface, user input to identify the foreground feature from the at least two features.

17. The device of claim 12, wherein, when identifying the one or more features within the reference image, the one or more processors are further to execute the instructions to:
receive user input, via a user interface on the device, to trace an outline of the one or more features.

18. A non-transitory computer-readable medium containing instructions executable by at least one processor, the computer-readable medium comprising one or more instructions to:
receive a reference image and reference image data collected contemporaneously with the reference image, wherein the reference image data includes a geolocation, a direction heading, and a tilt;
identify, for a user of the computing device, one or more features within the reference image that are available for selection as foreground features;
receive a user's selection of a foreground feature within the reference image from the one or more features;
provide, via a user interface, a catalog of virtual objects;
receive a user's selection of a virtual object from the catalog;
receive a user's size and placement information for the virtual object within the reference image where the virtual object and the foreground feature overlap to make the foreground feature appear in front of the virtual object;
compile a virtual object definition that includes the selected virtual object, the size, and the placement information of the virtual object relative to the foreground feature, wherein the virtual object is provided in a virtual layer appearing behind the foreground feature within the reference image; and
store, in a memory, the reference image data and virtual object definition.

19. The non-transitory computer-readable medium claim 18, further comprising one or more instructions to:
receive, from a mobile device, an indication that the mobile device is in a reference position that corresponds to the reference image data;
receive, from the mobile device, a video feed while the mobile device is in the reference position;
detect the foreground feature in an image from the video feed; and
instruct the mobile device to present the virtual object in the virtual layer appearing behind the foreground feature in images of the video feed, when the foreground feature is detected.

20. The non-transitory computer-readable medium claim 18, further comprising one or more instructions to:
render the virtual object to appear at least partially occluded by the foreground feature.

* * * * *